(12) United States Patent
Shaw et al.

(10) Patent No.: US 11,053,936 B2
(45) Date of Patent: Jul. 6, 2021

(54) TWO PIECE PUMP ROD

(71) Applicant: Graco Minnesota Inc., Minneapolis, MN (US)

(72) Inventors: Derek R. Shaw, Hopkins, MN (US); John R. Ingebrand, New Prague, MN (US); Joseph A. Daniski, Minnetonka, MN (US); Daniel J. Rogers, Lindstrom, MN (US); Corey D. Meyer, Prior Lake, MN (US)

(73) Assignee: Graco Minnesota Inc., Minneapolis, MN (US)

( * ) Notice: Subject to any disclaimer, the term of this patent is extended or adjusted under 35 U.S.C. 154(b) by 259 days.

(21) Appl. No.: 16/419,790

(22) Filed: May 22, 2019

(65) Prior Publication Data

US 2019/0271306 A1 Sep. 5, 2019

Related U.S. Application Data

(62) Division of application No. 15/142,820, filed on Apr. 29, 2016, now Pat. No. 10,302,080.

(Continued)

(51) Int. Cl.
*F04B 53/22* (2006.01)
*F04B 13/00* (2006.01)
(Continued)

(52) U.S. Cl.
CPC ............. *F04B 53/22* (2013.01); *B23P 6/00* (2013.01); *F04B 13/00* (2013.01); *F04B 17/03* (2013.01);
(Continued)

(58) Field of Classification Search
CPC .......... F04B 53/22; F04B 53/10; F04B 13/00; F04B 17/03; F04B 53/14; F04B 53/16;
(Continued)

(56) References Cited

U.S. PATENT DOCUMENTS 636,647 A 11/1899 Eisenhuth
852,033 A 4/1907 Phillippe
(Continued)

FOREIGN PATENT DOCUMENTS

KR 20120026399 A 3/2012

OTHER PUBLICATIONS

Australian Examination Report for Australian Patent Application No. 2016258893, dated Jan. 24, 2020, 5 pages.
(Continued)

*Primary Examiner* — Ryan J. Walters
(74) *Attorney, Agent, or Firm* — Kinney & Lange, P.A.

(57) ABSTRACT

A metering pump includes a motor having a motor shaft extending through a drive housing, a carriage assembly disposed around the motor shaft and within the drive housing, a plunger return block mounted to the carriage assembly, a piston disposed along an axis, a carriage bearing disposed on the motor shaft and within the carriage assembly and slidably coupled to the carriage assembly, a cam coupled to the motor shaft to rotate with the motor shaft, and a bearing disposed around the cam to rotate therewith and to contact the stroke adjuster and the plunger return block. The piston also includes a stroke adjuster mounted to the carriage assembly, a plunger having a button-shaped protrusion end, and a drive shaft having a first end connected to the stroke adjuster and a second end having a hook protrusion configured to receive and engage the plunger button-shaped protrusion end.

20 Claims, 9 Drawing Sheets

Related U.S. Application Data

(60) Provisional application No. 62/155,577, filed on May 1, 2015.

(51) Int. Cl.
  *F04B 17/03*   (2006.01)
  *F04B 53/14*   (2006.01)
  *F04B 53/16*   (2006.01)
  *F04B 53/10*   (2006.01)
  *B23P 6/00*    (2006.01)

(52) U.S. Cl.
  CPC ............. *F04B 53/10* (2013.01); *F04B 53/14* (2013.01); *F04B 53/16* (2013.01); *Y10T 29/49229* (2015.01); *Y10T 29/49238* (2015.01)

(58) Field of Classification Search
  CPC . B23P 6/00; Y10T 29/49238; Y10T 29/49229
  See application file for complete search history.

(56) References Cited

U.S. PATENT DOCUMENTS

| | | |
|---|---|---|
| 1,765,237 A | 6/1930 | King |
| 2,366,237 A | 1/1945 | Clausen |
| 2,592,237 A | 4/1952 | Bradley |
| 2,675,759 A | 4/1954 | Yarger |
| 3,584,610 A | 6/1971 | Porter |
| 3,612,727 A | 10/1971 | Drake |
| 3,816,029 A | 6/1974 | Bowen et al. |
| 4,192,223 A | 3/1980 | Lombard |
| 4,264,286 A | 4/1981 | Reinkemeyer |
| 4,399,421 A | 8/1983 | MacLean |
| RE31,608 E | 6/1984 | Magnussen, Jr. |
| 4,498,372 A | 2/1985 | Pareja |
| 4,830,589 A | 5/1989 | Pareja |
| 5,022,556 A | 6/1991 | Dency et al. |
| 5,066,199 A | 11/1991 | Reese et al. |
| 5,145,339 A | 9/1992 | Lehrke et al. |
| 5,158,438 A | 10/1992 | Olson et al. |
| 5,192,879 A | 3/1993 | Aoki et al. |
| 5,769,321 A | 6/1998 | Cyphers |
| 5,890,415 A | 4/1999 | Asou |
| 6,213,064 B1 | 4/2001 | Geung |
| 6,595,278 B1 | 7/2003 | Lam et al. |
| 6,623,259 B1 | 9/2003 | Blume |
| 7,938,632 B2 | 5/2011 | Smith |
| 8,182,247 B2 | 5/2012 | Gallwey et al. |
| 8,454,328 B2 | 6/2013 | Kotlyar et al. |
| 8,601,687 B2 | 12/2013 | Ochoa et al. |
| 8,651,840 B2 | 2/2014 | Gang |
| 8,904,918 B2 | 12/2014 | Lee et al. |
| 9,284,953 B2 | 3/2016 | Blume |
| 9,638,185 B2 | 5/2017 | Hines et al. |
| 9,791,082 B2 | 10/2017 | Baxter et al. |
| 10,961,994 B1* | 3/2021 | Ballard, Jr. ............. F04B 53/22 |
| 2003/0084556 A1* | 5/2003 | Dunlop ................. B25B 27/023 29/259 |
| 2006/0266030 A1 | 11/2006 | Solomon et al. |
| 2006/0275164 A1 | 12/2006 | Ganser |
| 2007/0169619 A1 | 7/2007 | Smith |
| 2009/0123303 A1 | 5/2009 | Ohnishi |
| 2010/0325888 A1* | 12/2010 | Hawes ..................... F04B 53/22 29/888.021 |
| 2011/0030213 A1* | 2/2011 | Hawes .................. F04B 1/0404 29/888.02 |
| 2012/0183424 A1 | 7/2012 | Bayyouk et al. |
| 2014/0356201 A1 | 12/2014 | Blume |
| 2016/0319808 A1 | 11/2016 | Shaw et al. |

OTHER PUBLICATIONS

Australian Examination Report for Australian Patent Application No. 2016258571, dated Sep. 20, 2019, 2 pages.
TXAMPumps, HBT1, 2 pages.
Sidewinder Pumps, Inc., Chemical Metering Pumps, Solar Powered Chemical Pump, 12 pages.
Instructions-Parts Wolverine Chemical Injection Pump, Graco, Revision C, Nov. 2015, 58 pages.
Written Opinion and International Search Report, for PCT Patent Application No. PCT/US2016/030162, dated Aug. 16, 2016, 10 pages.
International Preliminary Report on Patentability for PCT Application No. PCT/US2016/030162, dated Nov. 7, 2017, 6 Pages.
International Search Report and Written Opinion for PCT Application No. PCT/US2016/030160, dated Aug. 16, 2016, 11 Pages.
International Preliminary Report on Patentability for PCT Application No. PCT/US2016/030160, dated Nov. 7, 2017, 7 Pages.

* cited by examiner

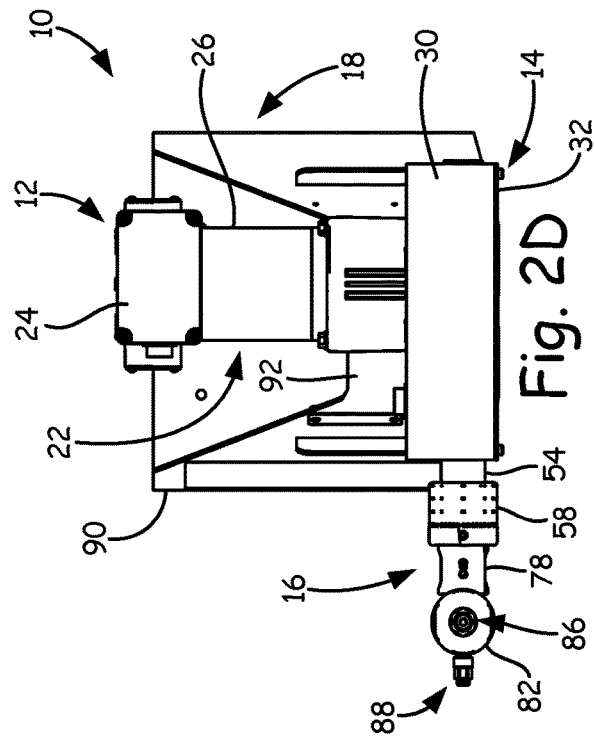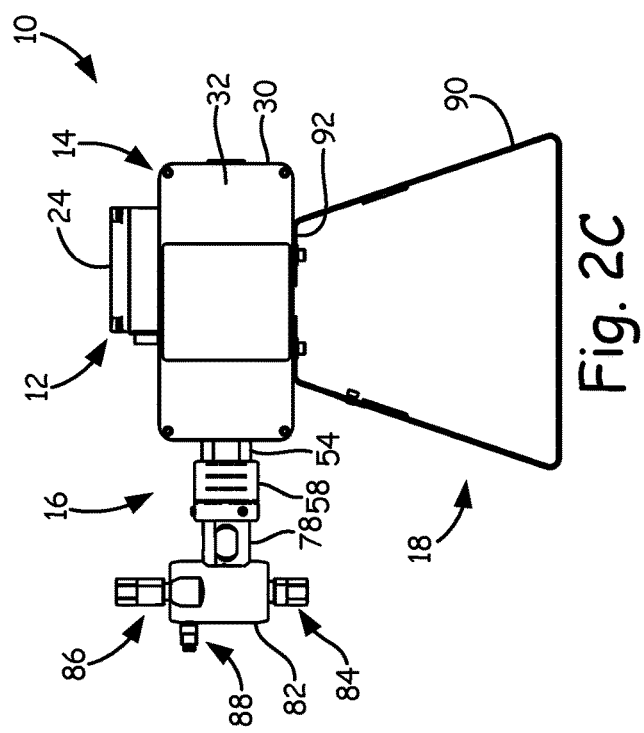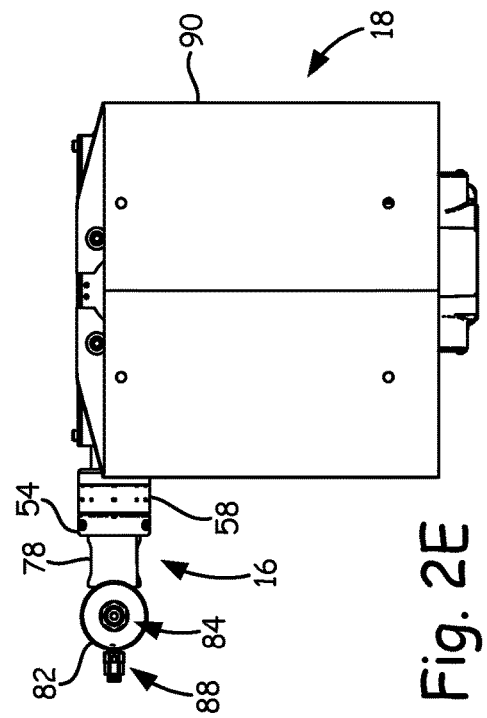

US 11,053,936 B2

TWO PIECE PUMP ROD

CROSS-REFERENCE TO RELATED APPLICATION

This application is a division of U.S. application Ser. No. 15/142,820 filed Apr. 29, 2016 and entitled "TWO PIECE PUMP ROD," which claims priority to U.S. Provisional Application No. 62/155,577 filed on May 1, 2015 and entitled "TWO PIECE PUMP ROD," the entire contents of which are hereby incorporated by reference in their entireties.

BACKGROUND

Companies in the oil and natural gas industry often use metering pumps to transfer fluids in harsh or remote locations. Many such pumps provide precise fluid dispensation by converting rotational motion delivered from a solar or AC grid powered motor to linear reciprocating motion in a piston. During a complete piston stroke, fluid is both drawn into the pump and discharged from the pump at a particular rate depending on piston displacement and rotation cycle time. Frictional forces and side loading acting within these pumps can cause both wear on pump components and operational inefficiency. Wear often decreases the life of these components and results in failure modes requiring downtime for repair. Pump inefficiency can increase demand load on the sources powering the pump. Minimizing component wear and pump inefficiency can thus reduce end-user costs.

While metering pumps typically drive a piston using a cam, many use either spring or carriage assemblies to return the piston. In spring assemblies, the spring force used to return the piston can act against it during the discharge stroke, causing higher energy penalties and additional wear on the pump head and rotary components. Carriage assemblies, by contrast, can require a number of additional parts to facilitate piston return. Using additional parts often provides more wear points and thus more potential failure modes.

Metering pump pistons generally reciprocate within a channel. Friction between the piston and the rotary components attached to the motor can impart a slight rotation on the piston. This rotation in turn causes side loading on the parts forming the piston channel. Side loading on these parts decreases the life thereof and can necessitate pump repair. It can also force end-users to purchase more replacement parts.

SUMMARY

In one embodiment, a metering pump includes a motor having a motor shaft extending through a drive housing, a carriage assembly disposed around the motor shaft and within the drive housing, a plunger return block mounted to the carriage assembly, a piston disposed along an axis, a carriage bearing disposed on the motor shaft and within the carriage assembly and slidably coupled to the carriage assembly, a cam coupled to the motor shaft to rotate with the motor shaft, and a bearing disposed around the cam to rotate therewith and to contact the stroke adjuster and the plunger return block. The piston also includes a stroke adjuster mounted to the carriage assembly, a plunger having a button-shaped protrusion end, and a drive shaft having a first end connected to the stroke adjuster and a second end having a hook protrusion configured to receive and engage the plunger button-shaped protrusion end.

In another embodiment, a method of servicing a metering pump is provided, wherein the metering pump includes a drive housing, a drive shaft, a drive cylinder, a dust cover disposed around the drive cylinder, a pump section that includes a packing nut, a fluid cylinder, and a plunger, and set screws that fasten the drive cylinder to the fluid cylinder. The method includes rotating the dust cover with respect to the drive cylinder, sliding the dust cover toward the drive housing to expose the packing nut, loosening the packing nut, removing the set screws from the drive cylinder, releasing the drive cylinder from the fluid cylinder, disengaging the plunger having a button shaped end from the drive shaft having a hook shaped receiving end, and removing the pump section from the metering pump.

BRIEF DESCRIPTION OF THE DRAWINGS

FIG. 2C is a front view of the metering pump shown in FIG. 2A.
FIG. 2D is a top plan view of the metering pump shown in FIG. 2A.
FIG. 2E is a bottom plan view of the metering pump shown in FIG. 2A.

DETAILED DESCRIPTION

Figure 1:
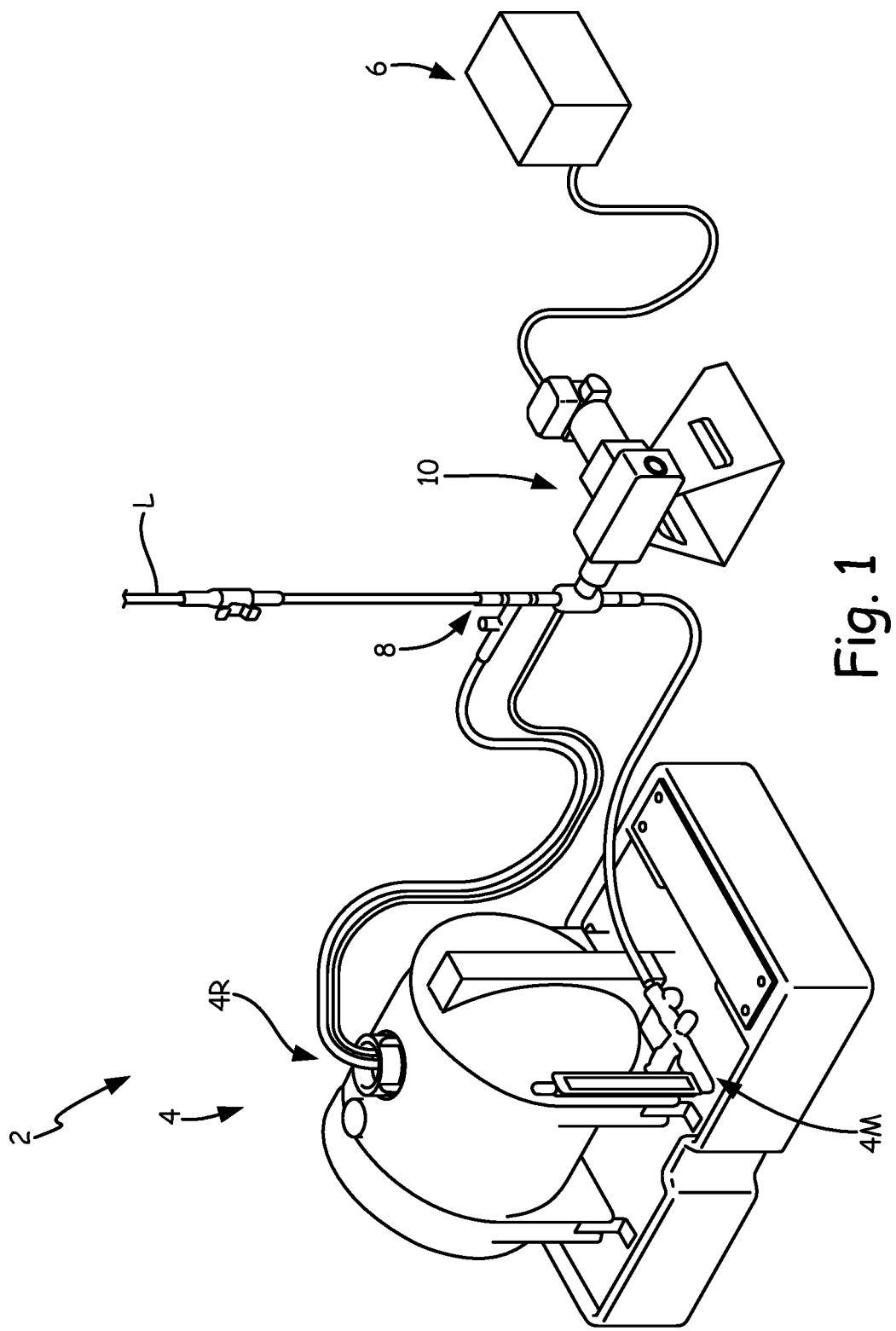
FIG. 1 is an isometric view of a metering pump assembly.

FIG. 1 is an isometric view of metering pump assembly 2, which includes tank 4 (which further comprises tank recirculation port 4R and tank manifold assembly 4M), power source 6, pressure relief valve 8, metering pump 10, and supply line L. Tank 4 is connected to metering pump 10. Metering pump 10 is connected to tank 4, power source 6, and pressure relief valve 8. Pressure relief valve 8 is positioned downstream from the outlet of metering pump 10. Power source 6 provides electrical power to metering pump 10. Metering pump 10 draws fluid from tank manifold assembly 4M and then provides the fluid through supply line L to a desired location. Pressure relief valve 8 receives fluid from metering pump 10 and can redirect fluid if the pressure surpasses a threshold. Fluid diverted by pressure relief valve 8 can be recirculated to tank 4 through tank recirculation port 4R.

Figure 2A:
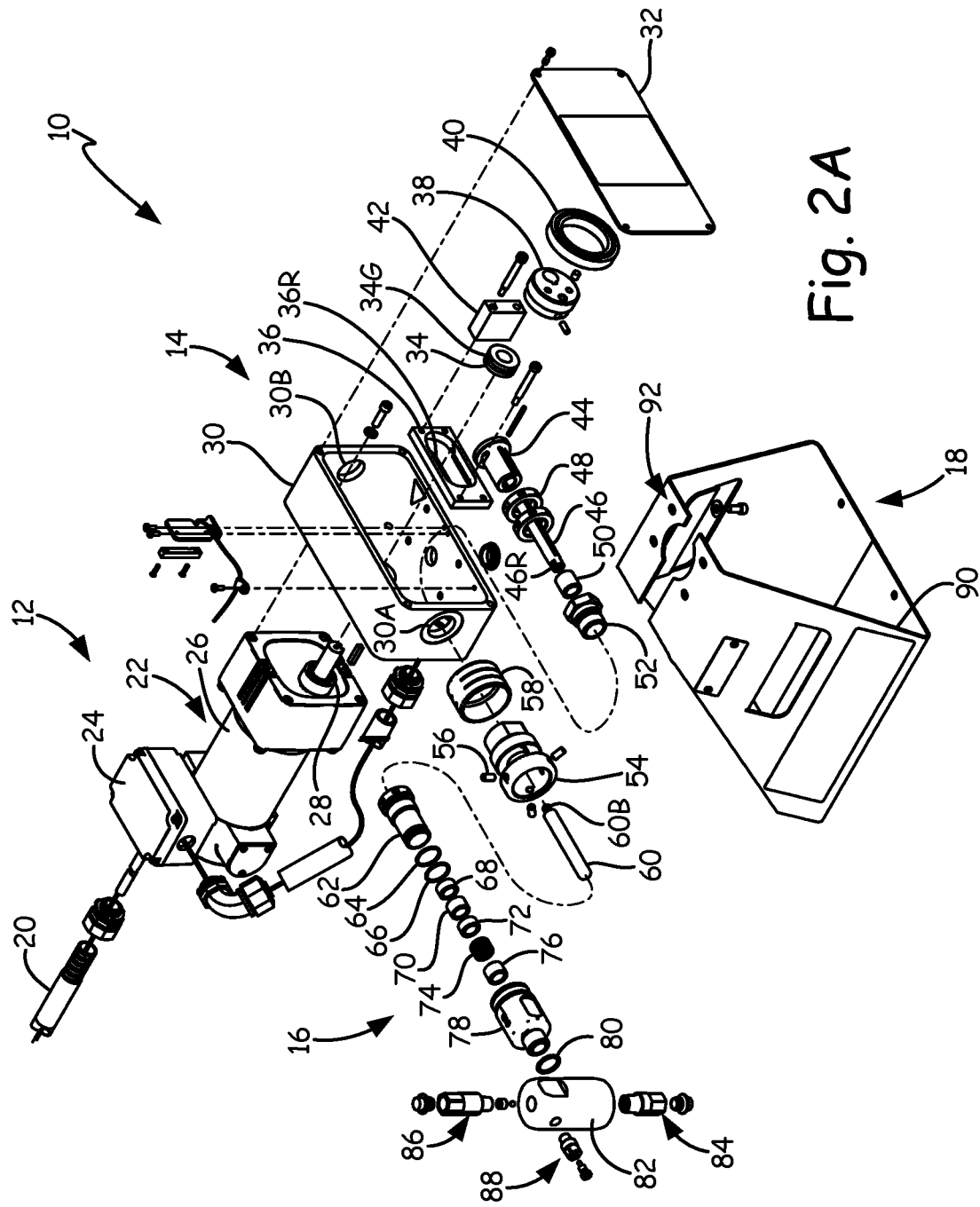
FIG. 2A is an exploded isometric view one implementation of a metering pump.
Figure 2B:
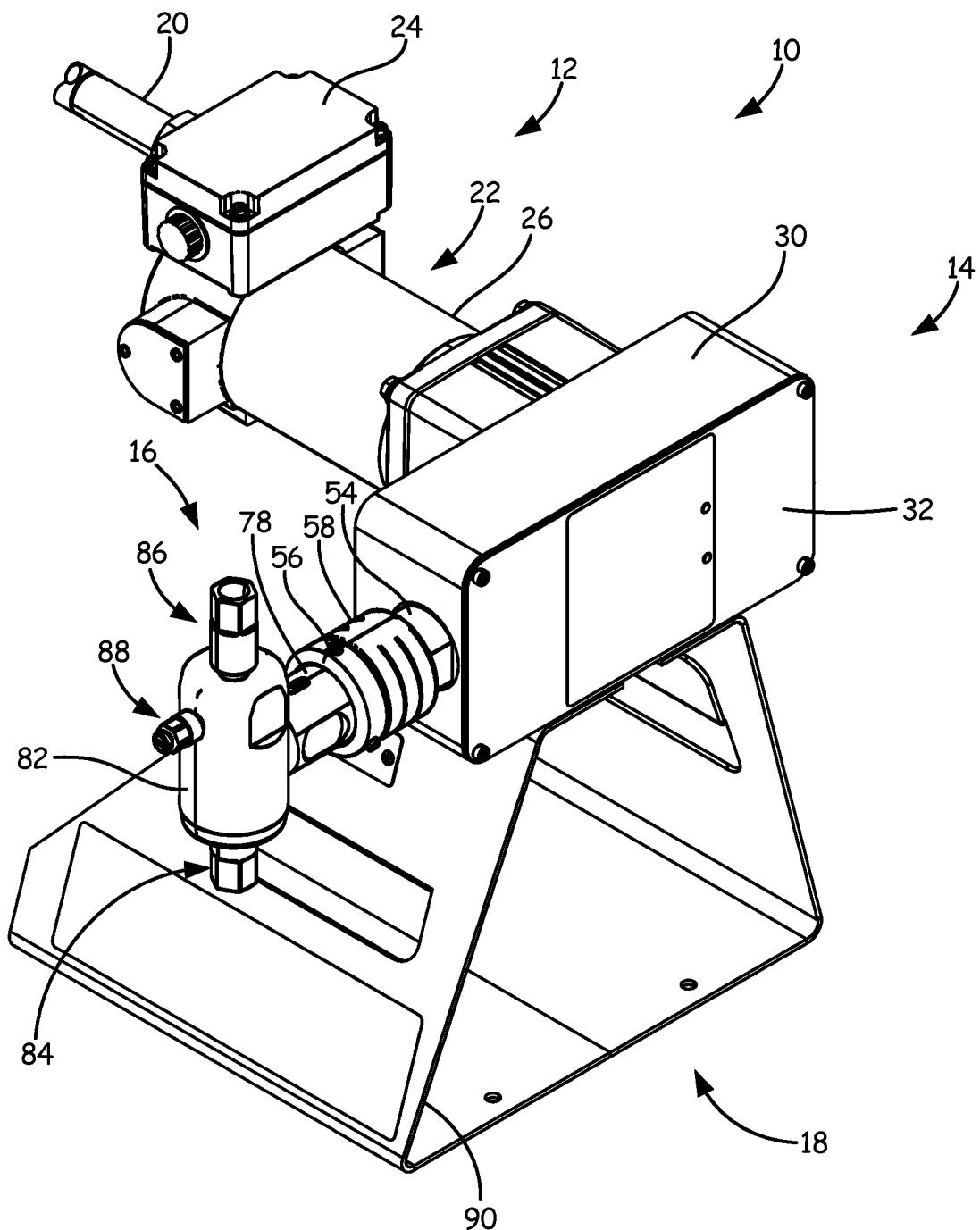
FIG. 2B is an isometric view of the metering pump shown in FIG. 2A.

FIG. 2A is an exploded isometric view of one implementation of metering pump 10. FIG. 2B is an isometric view of metering pump 10 shown in FIG. 2A. FIG. 2C is a front view of metering pump 10 shown in FIG. 2A. FIG. 2D is a top plan view of metering pump 10 shown in FIG. 2A. FIG. 2E is a bottom plan view of metering pump 10 shown in FIG. 2A. FIGS. 2A-2E will be discussed together in the following description. Metering pump 10 includes motor section 12, drive housing section 14, pump section 16, and base section 18. Motor section 12 includes conduit 20 and motor 22. Motor 22 further includes junction box 24, motor housing 26, and motor shaft 28. Drive housing section 14 includes drive housing 30 (having first drive housing port 30A and second drive housing port 30B), drive guard 32, carriage bearing 34 (which includes carriage bearing groove 34G), carriage assembly 36 (which includes carriage assembly inner ridge 36R), cam 38, ball bearing 40, plunger return block 42, stroke adjuster 44, drive shaft 46 (which includes drive shaft receiving end 46R), stroke adjuster nut 48, sleeve bearing 50, drive cylinder mating component 52, drive cylinder 54, set screws 56, and dust cover 58. Pump section 16 includes plunger 60 (which includes plunger button end 60B), packing nut 62, backup ring 64, o-ring 66, first plunger bearing 68, first spacer 70, second plunger bearing 72, packing seal 74, second spacer 76, fluid cylinder 78, o-ring 80, valve housing 82, inlet check valve 84, and outlet check valve 86. Base section 18 includes base 90 and base mounting surface 92.

Motor section 12 is connected to drive housing section 14. Drive housing section 14 is connected to motor section 12, pump section 16, and base section 18. Pump section 16 is connected to drive section 14. Base section 18 is connected to drive housing section 14. Motor section 12 provides rotational motion to the components in the drive housing section 14. Drive housing section 14 converts rotational motion from motor section 12 into a linear reciprocating motion to drive pump section 16. Pump section 16 provides fluid at a desired rate. Base section 18 supports metering pump 10.

Regarding motor section 12, conduit 20 is connected to junction box 24 of motor 22. Motor housing 26 is connected to drive housing 30. Motor shaft 28 is positioned to extend along a longitudinal axis of motor 22 and into drive housing 30. Conduit 20 contains wiring that connects a power source to motor 22. Junction box 24 protects electrical components of motor 22 and connects to conduit 20. Motor housing 26 mounts motor section 12 to drive housing 30 of drive housing section 14. Motor shaft 28 extends and rotates through motor housing 26 into drive housing 30. Motor 22 imparts rotational motion via motor shaft 28 for conversion into linear reciprocating motion in drive housing section 14.

Regarding drive housing section 14, drive housing 30 is connected to motor housing 26, drive guard 32, carriage bearing 34, drive cylinder mating component 52, drive cylinder 54, and mounting surface 92 of base section 18. Carriage bearing 34 is connected to motor shaft 28, drive housing 30, carriage assembly 36, and cam 38 and is positioned within carriage assembly 36. Carriage assembly 36 is connected to plunger return block 42 and stroke adjuster 44 and is positioned around carriage bearing 34. Carriage assembly inner ridge 36R is positioned within carriage bearing groove 34G. Cam 38 is connected to motor shaft 28 and is positioned to abut carriage bearing 34. Ball bearing 40 is connected to and positioned to surround cam 38. Plunger return block 42 is connected to carriage assembly 36. Stroke adjuster 44 is connected to carriage assembly 36, drive shaft 46, and stroke adjuster nut 48. Drive shaft 46 is connected to stroke adjuster 44 and plunger 60 and is positioned within sleeve bearing 50. Stroke adjuster nut 48 is connected to stroke adjuster 44. The inner radial surface of sleeve bearing 50 abuts drive shaft 46, while the outer radial surface of sleeve bearing 50 abuts the inner radial surface of drive cylinder mating component 52. The inner radial surface of drive cylinder mating component 52 abuts the outer radial surface of sleeve bearing 50, while the outer radial surface of drive cylinder mating component 52 abuts the inner radial surface of drive housing 30 at first drive housing port 30A. Drive cylinder mating component 52 is also connected to drive cylinder 54. Drive cylinder 54 is connected to drive housing 30, drive cylinder mating component 52, set screws 56, dust cover 58, packing nut 62, and fluid cylinder 78. Set screws 56 are connected to drive cylinder 54 and fluid cylinder 78 of pump section 16. Dust cover 58 is positioned around and is connected to drive cylinder 54.

Drive housing 30 protects internal components and mounts to motor section 12, pump section 16, and base section 18. Drive housing 30 also connects to drive guard 32. Drive guard 32 protects and allows access to components within drive housing 30. Carriage bearing 34 mounts to motor shaft 28 and drive housing 30 and sits within carriage assembly 36. Carriage bearing 34 restricts the movement of carriage assembly 36 and also provides a bearing surface upon which cam 38 can rotate. Carriage bearing 34 also acts as a second point of contact for carriage assembly 36 in order to maintain horizontal alignment as carriage assembly 36 reciprocates with the movement of stroke adjuster 44. Carriage assembly 36 connects to stroke adjuster 44 and plunger return block 42 and facilitates the return of drive shaft 46 and plunger 60 once depressed by cam 38 and ball bearing 40. Cam 38 connects to and rotates with motor shaft 28. Ball bearing 40 surrounds cam 38 and contacts stroke adjuster 44 as cam 38 rotates, depressing drive shaft 46 and plunger 60. Plunger return block 42 provides a contact point for ball bearing 40 rotating on cam 38 to return the depressed piston formed in part by stroke adjuster 44, drive shaft 46 and plunger 60. Stroke adjuster 44 serves as a first contact point for maintaining the horizontal alignment of carriage assembly 36 in conjunction with the second point of contact provided by carriage bearing 34. Stroke adjuster 44 also depresses drive shaft 46 and plunger 60 when contacted by ball bearing 40 and cam 38. Stroke adjuster 44 and stroke adjuster nut 48 allow for control of stroke length. Drive shaft 46 connects to and transfers linear motion to plunger 60. Sleeve bearing 50 supports and directs the motion of drive shaft 46. Drive cylinder mating component 52 fastens drive cylinder 54 to drive housing 30. Set screws 56 secure drive cylinder 54 to fluid cylinder 78. Dust cover 58 provides a protective barrier over a portion of drive cylinder 54.

Regarding pump section 16, plunger 60 is connected to drive shaft 46, first plunger bearing 68, first spacer 70, second plunger bearing 72, packing seal 74, and second spacer 76. Plunger button end 60B is connected to drive shaft receiving end 46R. Packing nut 62 is connected to drive cylinder 54, backup ring 64, o-ring 66, first plunger bearing 68, first spacer 70, second plunger bearing 72, packing seal 74, second spacer 76, and fluid cylinder 78. First plunger bearing 68 is connected to plunger 60, packing nut 62, and first spacer 70. The radial inner surface of first plunger bearing 68 abuts the radial outer surface of plunger 60, while the radial outer surface of first plunger bearing 68 abuts the radial inner surface of packing nut 62. First spacer 70 is connected to plunger 60, packing nut 62, first plunger bearing 68, and second plunger bearing 72. The radial inner surface of first spacer 70 abuts the radial outer surface of plunger 60, while the radial outer surface of first spacer 70 abuts the radial inner surface of packing nut 62. Second plunger bearing 72 is connected to plunger 60, packing nut 62, first spacer 70, and packing seal 74. The radial inner surface of second plunger bearing 72 abuts the radial outer surface of plunger 60, while the radial outer surface of second plunger bearing 72 abuts the radial inner surface of packing nut 62. Packing seal 74 is connected to plunger 60, packing nut 62, second plunger bearing 72, and second spacer 76. The radial inner surface of packing seal 74 abuts the radial outer surface of plunger 60, while the radial outer surface of packing seal 74 abuts the radial inner surface of packing nut 62. Second spacer 76 is connected to plunger 60, packing nut 62, packing seal 74, and fluid cylinder 78. The radial inner surface of second spacer 76 abuts the radial outer surface of plunger 60, while the radial outer surface of second spacer 76 abuts the radial inner surface of packing nut 62. Fluid cylinder 78 is connected to drive cylinder 54, packing nut 62, second spacer 76, and valve housing 82. O-ring 80 is connected to fluid cylinder 78. Valve housing 82 is connected to inlet check valve 84, outlet check valve 86, and bleed valve 88.

Plunger 60 connects to drive shaft 46 and moves in a linear reciprocating motion therewith. Plunger button end 60B connects to drive shaft receiving end 46R. As plunger 60 translates toward valve housing 82, fluid is pushed through outlet check valve 86. As plunger is pulled away from valve housing 82 and toward drive housing 30, fluid is drawn into valve housing 82 through inlet check valve 84. Packing nut 62, first plunger bearing 68, first spacer 70, second plunger bearing 72, packing seal 74, second spacer 76, and fluid cylinder 78 provide a channel within which plunger 60 reciprocates. Packing nut 62 presses first plunger bearing 68, first spacer 70, second plunger bearing 72, packing seal 74, and second spacer 76 together to seal the channel. O-ring 66 and backup ring 64 provide a sealing interface between packing nut 62 and fluid cylinder 78. O-ring 80 provides a sealing interface between fluid cylinder 78 and valve housing 82. Bleed valve 88 purges air to facilitate proper fluid flow.

Regarding base section 18, base 90 includes a mounting surface 92. Mounting surface 92 is connected to drive housing 30. Base 90 mounts to drive housing 30 at mounting surface 92 and provides support for metering pump 10.

Metering pump 10 can draw fluid from tank manifold assembly 4M (shown in FIG. 1) into inlet check valve 84 and then discharge the fluid to supply line L (shown in FIG. 1) through outlet check valve 86. Fluid is drawn into and discharged from metering pump 10 based on the displacement of the piston formed by stroke adjuster 44, drive shaft 46, and plunger 60 and rotation cycle time of motor shaft 28, cam 38 and ball bearing 40. Metering pump 10 converts rotational motion from motor shaft 28, cam 38 and ball bearing 40 into linear reciprocating motion in the piston. Plunger 60 and a portion of drive shaft 46 move linearly within a channel formed by sleeve bearing 50, drive cylinder mating component 52, packing nut 62, first plunger bearing 68, first spacer 70, second plunger bearing 72, packing seal 74, second spacer 76, and fluid cylinder 78. A complete piston stroke includes both suction and discharge strokes. The suction stroke draws fluid into inlet check valve 84 to fill the volume formed by the face of plunger 60, packing nut 62, and valve housing 82. The discharge stroke pushes fluid out through outlet check valve 86 as the face of plunger 60 moves linearly in the direction of valve housing 82 relative to drive housing 30.

Motor 22 rotates motor shaft 28, which in turn rotates cam 38 and ball bearing 40 in drive housing 30. The eccentric rotation of cam 38 and ball bearing 40 acts to depress and return the piston so that it reciprocates within the channel formed by sleeve bearing 50, drive cylinder mating component 52, packing nut 62, first plunger bearing 68, first spacer 70, second plunger bearing 72, packing seal 74, second spacer 76, and fluid cylinder 78. Carriage assembly 36 attaches to plunger return block 42 and stroke adjuster 44 and facilitates the suction stroke of the piston. Carriage assembly 36, stroke adjuster 44, and plunger return block 42 act as a follower for cam 38 and ball bearing 40. The suction stroke of the piston begins when cam 38 and ball bearing 40 rotate to a position where the larger side of cam 38 is nearest to second drive housing port 30B, such that ball bearing 40 pushes on plunger return block 42. Pressing plunger return block 42 drives the carriage assembly 36 toward second drive housing port 30B along an axis formed along the length of the piston and extending through first drive housing port 30A and second drive housing port 30B. This in turn pulls plunger 60 away from valve housing 82 along the same axis, drawing fluid into inlet check valve 84 to fill the volume formed by the face of plunger 60, packing nut 62, and valve housing 82. As cam 38 and ball bearing 40 continue to rotate into a position where the larger portion of cam 38 is nearest drive housing port 30A, ball bearing 40 pushes on stroke adjuster 44, depressing the piston formed by stroke adjuster 44, drive shaft 46, and plunger 60 and initiating the discharge stroke. Depressing the piston pushes both the piston and carriage assembly 36 toward first drive housing port 30A along the axis formed along the piston and extending through first drive housing port 30A and second drive housing port 30B and dispenses the volume drawn in during the suction stroke through outlet check valve 86. The continued rotation of motor shaft 28, cam 38 and ball bearing 40 in turn drives the continued reciprocation of the piston.

Carriage bearing 34 confers the advantage of providing a second point of contact for maintaining the alignment of carriage assembly 36 along the axis formed by first drive housing port 30A and second drive housing port 30B without needing any additional components or structures. Stroke adjuster 44 provides the first point of contact for carriage assembly 36 in aligning carriage assembly 36 along the axis formed along the length of the piston and extending through first drive housing port 30A and second drive housing port 30B as it moves between first drive housing port 30A and second drive housing port 30B with the rotation of cam 38 and ball bearing 40. Using carriage bearing 34 as the second point of contact for the alignment of carriage assembly 36 ensures that it does rotate with respect to the axis formed along the length of the piston and extending through first drive housing port 30A and second drive housing port 30B. This also limits the rotation of the piston within the channel. In prior art configurations, the use of additional bearings or even a dummy piston is typically required to ensure that a carriage assembly will not rotate. Using additional parts provides more wear points and thus more potential failure modes. Carriage bearing 34, by contrast, aligns carriage assembly 36 with the axis along the piston without the need for additional parts, reducing possible failure modes and potential repair downtime.

The coupling and structure of drive shaft receiving end 46R and plunger button end 60B confer the advantage of minimizing the side load applied to the channel components such as packing seal 74, ensuring a longer operating life. The connection of drive shaft receiving end 46R and plunger button end 60B is positioned to ensure that it avoids entering sleeve bearing 50 and packing seal 74 during the reciprocation of drive shaft 46 and plunger 60. In one implementation, plunger button end 60B has a button shape, while drive shaft receiving end has a corresponding shape, such as a hook, permitting the mating of the two ends. The driveshaft receiving end 46R and plunger button end 60B connection provides a degree of freedom of movement between drive shaft 46 and plunger 60 so that any flex or rotation imparted to drive shaft 46 is reduced or eliminated on plunger 60. As cam 38 and ball bearing 40 rotate into contact with stroke adjuster 44, ball bearing 40 tends to provide both a force depressing stroke adjuster 44 and drive shaft 46 and an orthogonal force imparting a slight rotation to drive shaft 46. The orthogonal force is the result of drag friction between stroke adjuster 44 and ball bearing 40 as cam 38 rotates. Rotation of drive shaft 46 can impart a side load downstream on a portion of the channel made up of packing nut 62, first plunger bearing 68, first spacer 70, second plunger bearing 72, packing seal 74, and second spacer 76. The degree of freedom in the connection mitigates or eliminates the propagation of the rotation on drive shaft 46, reducing side loading to the channel components. Reducing the side load on the channel components extends the operating life thereof. In particular, this connection extends the life of packing seal 74 by reducing the potential side loading applied from plunger 60 thereon. In addition, the drive shaft receiving end 46R and plunger button end 60B connection also confers the advantage of providing efficient changeover times, minimizing downtime for repair.

In another embodiment of metering pump 10, a second piston and pump section, like the piston and pump section 16, can be added in place of plunger return block 42. The second piston and second pump section operate like the piston and pump section 16.

Figure 3A:
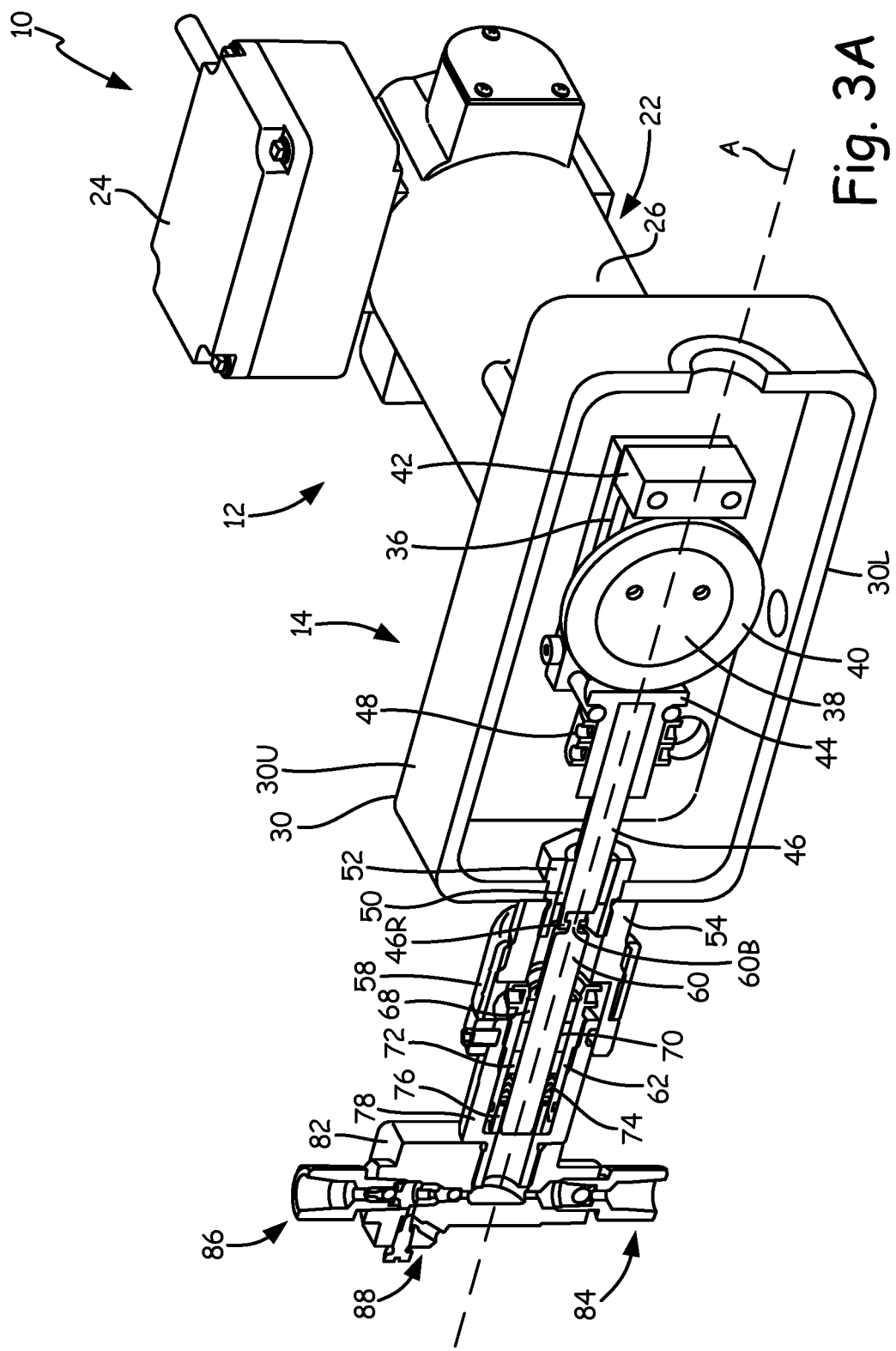
FIG. 3A is an isometric cross-sectional view of another implementation of a metering pump.
Figure 3B:
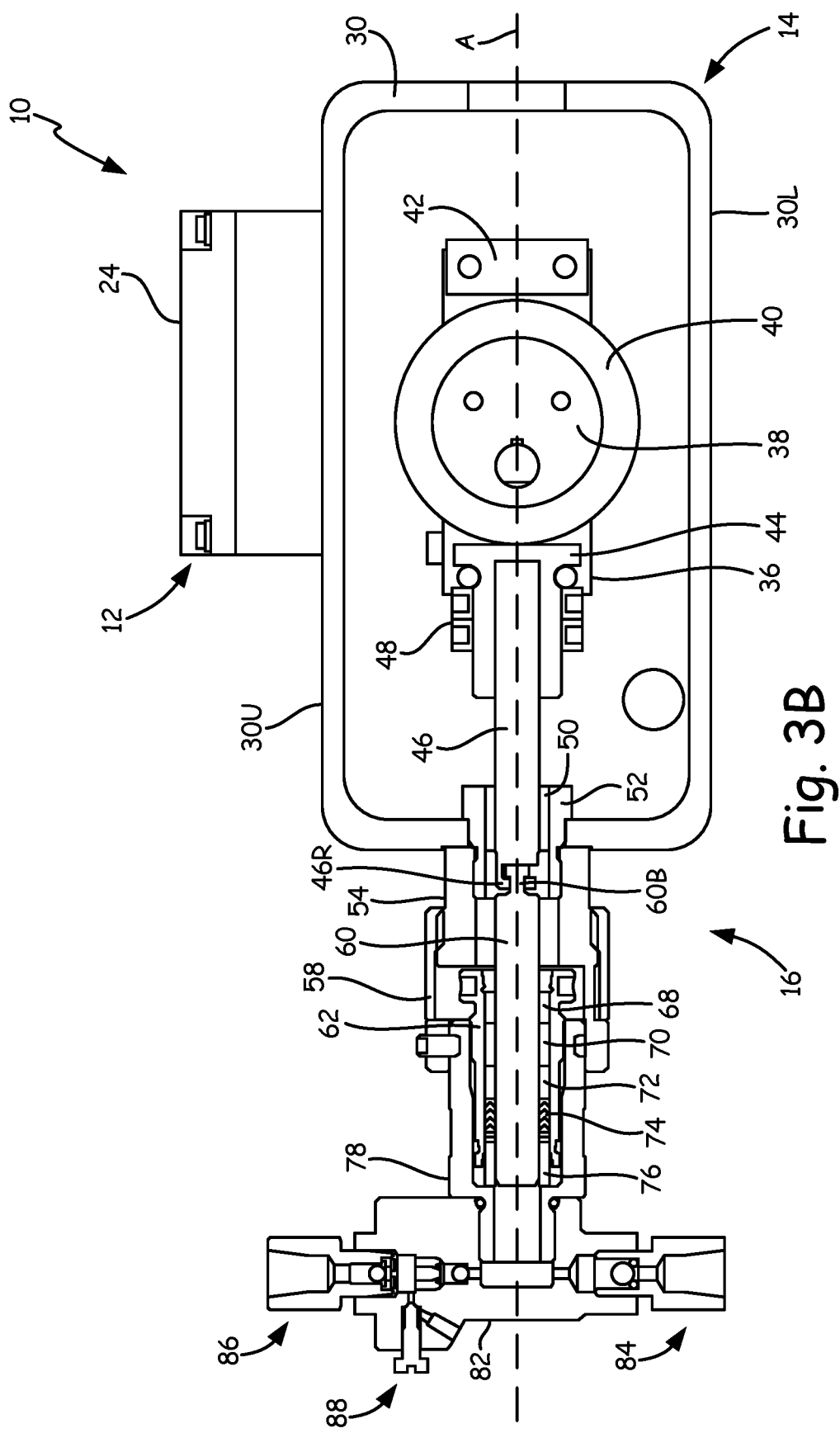
FIG. 3B is a front cross-sectional view of the metering pump shown in FIG. 3A.
Figure 3C:
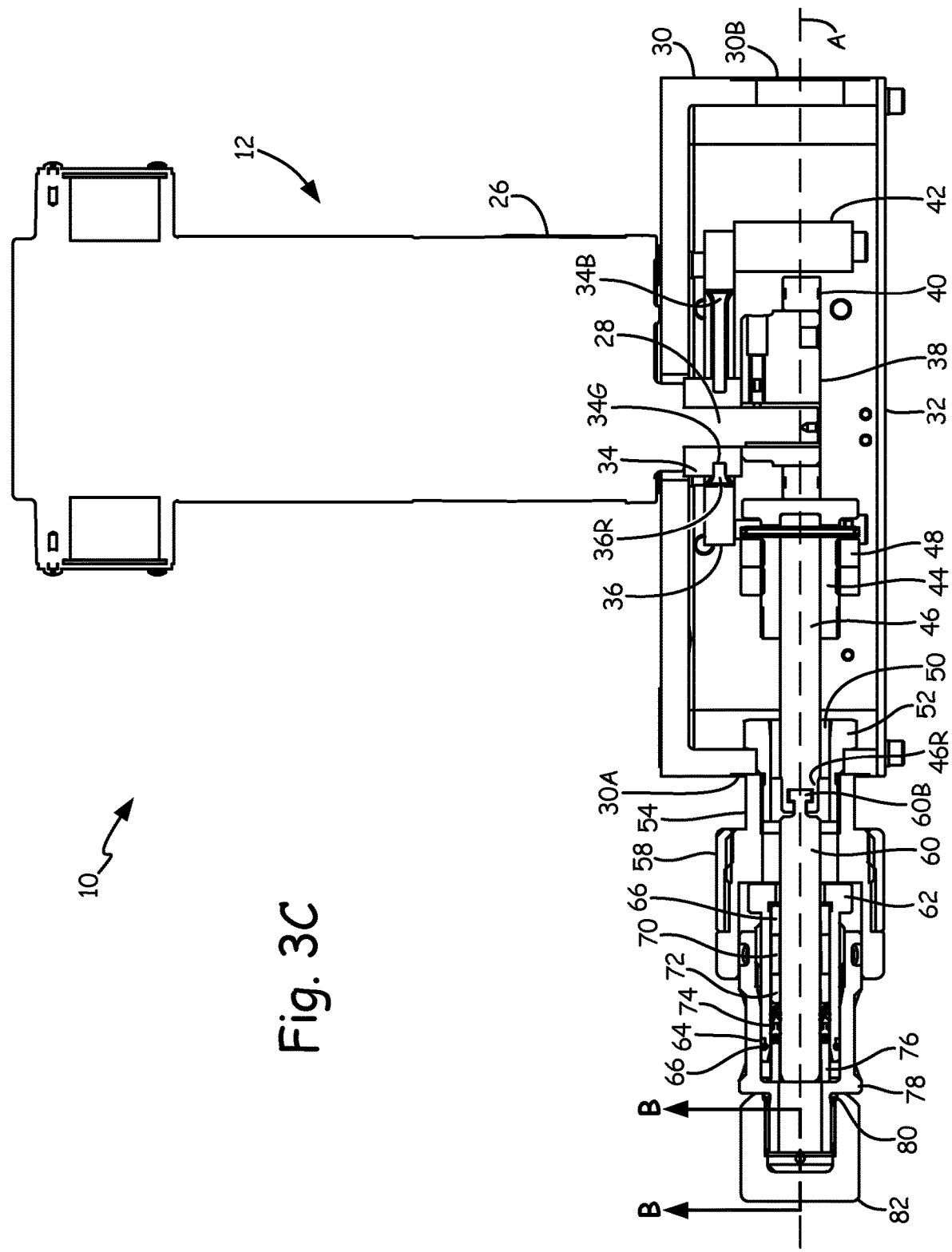
FIG. 3C is a bottom plan cross-sectional view of the metering pump shown in FIG. 3A.
Figure 3D:
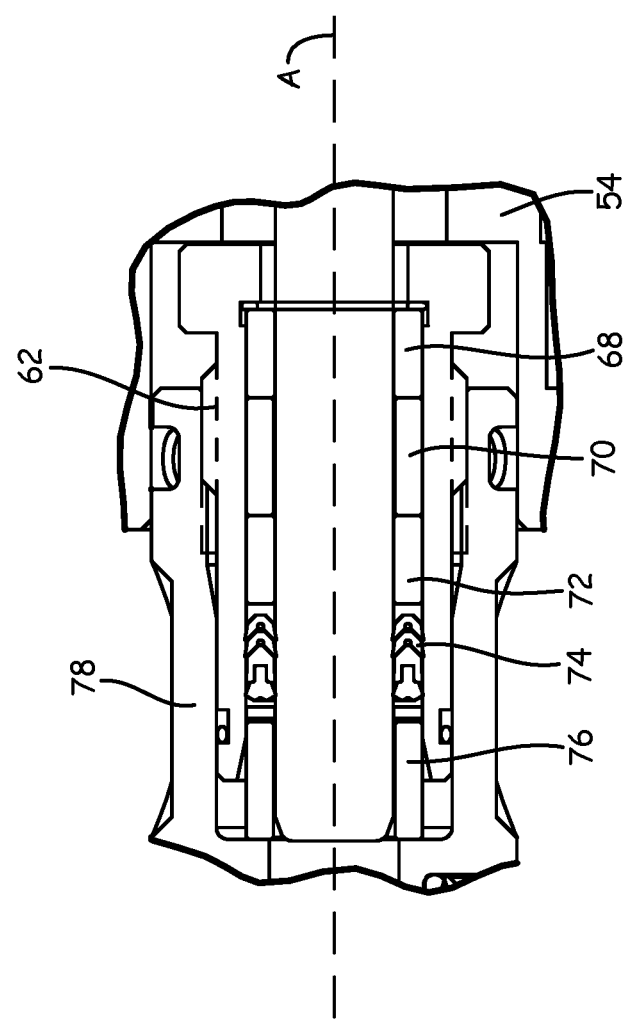
FIG. 3D is an enlarged view of metering pump 10 shown in FIG. 3C.

FIGS. 3A-3D illustrates another implementation of metering pump 10. FIGS. 3A-3D use similar reference characters to those used in FIGS. 2A-2E, even though some of the components, such as motor housing 26 and carriage assembly 36, differ somewhat in structure. A person of ordinary skill in the pertinent art would recognize that components having the same reference numerals perform the same or similar functions. FIG. 3A is an isometric cross-sectional view of chemical metering pump 10. FIG. 3B is a front cross-sectional view of metering pump 10 shown in FIG. 3A. FIG. 3C is a bottom plan cross-sectional view of metering pump 10 shown in FIG. 3A. FIG. 3D is an enlarged view of metering pump 10 shown in FIG. 3C. Metering pump 10 includes motor section 12, drive housing section 14, and pump section 16. Motor section 12 includes motor 22, junction box 24, motor housing 26, and motor shaft 28. Drive housing section 14 includes drive housing 30 (further comprising first drive housing port 30A, second drive housing port 30B, drive housing upper portion 30U, and drive housing lower portion 30L), drive guard 32, carriage bearing 34 (which includes carriage bearing groove 34G), carriage assembly 36 (which includes carriage assembly inner ridge 36R), cam 38, ball bearing 40, plunger return block 42, stroke adjuster 44, drive shaft 46 (which includes drive shaft receiving end 46R), stroke adjuster nut 48, sleeve bearing 50, drive cylinder mating component 52, drive cylinder 54, set screws 56, and dust cover 58. Pump section 16 includes plunger 60 (which includes plunger button end 60B), packing nut 62, backup ring 64, o-ring 66, first plunger bearing 68, first spacer 70, second plunger bearing 72, packing seal 74, second spacer 76, fluid cylinder 78, o-ring 80, valve housing 82, inlet check valve 84, and outlet check valve 86. Also shown in FIGS. 3A-3D is axis A.

Motor housing 26 is connected to drive housing 30. Motor shaft 28 is positioned to extend along a longitudinal axis of motor 22 and into drive housing 30. Drive housing 30 is connected to motor housing 26, drive guard 32, carriage bearing 34, drive cylinder mating component 52, drive cylinder 54, and mounting surface 92 of base section 18. Carriage bearing 34 is connected to motor shaft 28, drive housing 30, carriage assembly 36, and cam 38. Carriage assembly 36 is connected to plunger return block 42 and stroke adjuster 44. Carriage assembly inner ridge 36R is positioned within carriage bearing groove 34G. Cam 38 is connected to motor shaft 28 and is positioned to abut carriage bearing 34. Ball bearing 40 is connected to and positioned to surround cam 38. Plunger return block 42 is connected to carriage assembly 36. Stroke adjuster 44 is connected to carriage assembly 36, drive shaft 46, and stroke adjuster nut 48. Drive shaft 46 is connected to stroke adjuster 44 and plunger 60 and is positioned within sleeve bearing 50. Stroke adjuster nut 48 is connected to stroke adjuster 44. The inner radial surface of sleeve bearing 50 abuts drive shaft 46, while the outer radial surface of sleeve bearing 50 abuts the inner radial surface of drive cylinder mating component 52. The inner radial surface of drive cylinder mating component 52 abuts the outer radial surface of sleeve bearing 50, while the outer radial surface of drive cylinder mating component 52 abuts the inner radial surface of drive housing 30 at first drive housing port 30A. Drive cylinder mating component 52 is also connected to drive cylinder 54. Drive cylinder 54 is connected to drive housing 30, drive cylinder mating component 52, set screws 56, dust cover 58, packing nut 62, and fluid cylinder 78. Set screws 56 are connected to drive cylinder 54 and fluid cylinder 78 of pump section 16. Dust cover 58 is positioned around and is connected to drive cylinder 54.

Plunger 60 is connected to drive shaft 46, first plunger bearing 68, first spacer 70, second plunger bearing 72, packing seal 74, and second spacer 76. Plunger button end 60B is connected to drive shaft receiving end 46R. Packing nut 62 is connected to drive cylinder 54, backup ring 64, o-ring 66, first plunger bearing 68, first spacer 70, second plunger bearing 72, packing seal 74, second spacer 76, and fluid cylinder 78. First plunger bearing 68 is connected to plunger 60, packing nut 62, and first spacer 70. The radial inner surface of first plunger bearing 68 abuts the radial outer surface of plunger 60, while the radial outer surface of first plunger bearing 68 abuts the radial inner surface of packing nut 62. First spacer 70 is connected to plunger 60, packing nut 62, first plunger bearing 68, and second plunger bearing 72. The radial inner surface of first spacer 70 abuts the radial outer surface of plunger 60, while the radial outer surface of first spacer 70 abuts the radial inner surface of packing nut 62. Second plunger bearing 72 is connected to plunger 60, packing nut 62, first spacer 70, and packing seal 74. The radial inner surface of second plunger bearing 72 abuts the radial outer surface of plunger 60, while the radial outer surface of second plunger bearing 72 abuts the radial inner surface of packing nut 62. Packing seal 74 is connected to plunger 60, packing nut 62, second plunger bearing 72, and second spacer 76. The radial inner surface of packing seal 74 abuts the radial outer surface of plunger 60, while the radial outer surface of packing seal 74 abuts the radial inner surface of packing nut 62. Second spacer 76 is connected to plunger 60, packing nut 62, packing seal 74, and fluid cylinder 78. The radial inner surface of second spacer 76 abuts the radial outer surface of plunger 60, while the radial outer surface of second spacer 76 abuts the radial inner surface of packing nut 62. Fluid cylinder 78 is connected to drive cylinder 54, packing nut 62, second spacer 76, and valve housing 82. O-ring 80 is connected to fluid cylinder 78. Valve housing 82 is connected to inlet check valve 84, outlet check valve 86, and bleed valve 88.

Cam 38 and ball bearing 40 rotate eccentrically with the rotation of motor shaft 28. Carriage assembly 36, stroke adjuster 44, and plunger return block 42 act as a follower for cam 38 and ball bearing 40. As cam 38 and ball bearing 40 rotate in a circular path to a position where the larger portion of cam 38 is nearest drive housing port 30A, ball bearing 40 pushes on stroke adjuster 44, depressing the piston formed by stroke adjuster 44, drive shaft 46, and plunger 60. Depressing this piston in turn dispenses fluid through outlet check valve 86. As cam 38 and ball bearing 40 rotate to a position where the larger side of cam 38 is nearest to drive housing port 30B, ball bearing 40 pushes on plunger return block 42. Pressing plunger return block 42 drives the carriage assembly 36 and thus pulls piston formed by stroke adjuster 44, drive shaft 46, and plunger 60 back from the depressed position. Pulling back this piston draws fluid through inlet check valve 84.

Carriage bearing 34 sits within carriage assembly 36 and reduces friction for the reciprocating and linear translation of carriage assembly 36 between drive housing ports 30A and 30 B and along axis A. Carriage assembly inner ridge 36R couples to and translates along carriage bearing groove 34G. The coupling of carriage bearing 34 and carriage assembly 36 at the carriage bearing groove 34G and carriage assembly ridge 36R interface restricts carriage assembly 36 from traveling in undesirable directions. In particular, the coupling prevents carriage assembly 36 from translating back and forth along the axis extending through motor shaft 28 and drive guard 32 and up and down along the axis extending through drive housing upper portion 30U and drive housing lower portion 30L. It also prevents carriage assembly 36 from tilting back and forth between drive guard 32 and where motor section 12 mounts to drive housing 30.

Stroke adjuster 44 and carriage bearing 34 ensure the horizontal alignment of carriage assembly 36 with respect to axis A, as shown in FIG. 3B. Stroke adjuster 44 provides the first point of contact for carriage assembly 36. Absent a second point of contact, carriage assembly 36 would be free to rotate around and with motor shaft 28 with respect to axis A. Carriage bearing 34 provides a second point of contact to ensure that carriage assembly 36 maintains horizontal alignment. Using carriage bearing 34 as the second point of contact minimizes the number of components needed to align carriage assembly 36. Placing carriage bearing 34 on motor shaft 28 eliminates the need for incorporating additional aligning features, providing less wear points and possible failure modes. In prior art configurations, additional components, such as a dummy piston or multiple bearings, would be required to align a carriage assembly as it reciprocated. Such additional components provide more wear points and failure modes, which can force end-users to purchase more replacement parts.

Drive shaft receiving end 46R connects to plunger button end 60B, minimizing the side load applied to plunger 60 channel components such as packing seal 74. The connection is positioned to ensure that it avoids entering sleeve bearing 50 and packing seal 74 during the reciprocation of drive shaft 46 and plunger 60. As cam 38 and ball bearing 40 rotate into contact with stroke adjuster 44, ball bearing 40 tends to provide both a force depressing stroke adjuster 44 and drive shaft 46 and an orthogonal force imparting a slight rotation to drive shaft 46. The orthogonal force is result of drag friction between stroke adjuster 44 and ball bearing 40 as cam 38 rotates. The rotation of drive shaft 46 in turn imparts side load on the channel components. The driveshaft receiving end 46R and plunger button end 60B connection provides a degree of freedom between drive shaft 46 and plunger 60 so that any flex or rotation imparted to drive shaft 46 is reduced or eliminated on plunger 60, minimizing the side loading on first plunger bearing 68, first spacer 70, second plunger bearing 72, and packing seal 74. Reducing the side load on packing seal 74 increases the life thereof. In addition, the drive shaft receiving end 46R and plunger button end 60B connection permits efficient changeover.

Figure 4B:
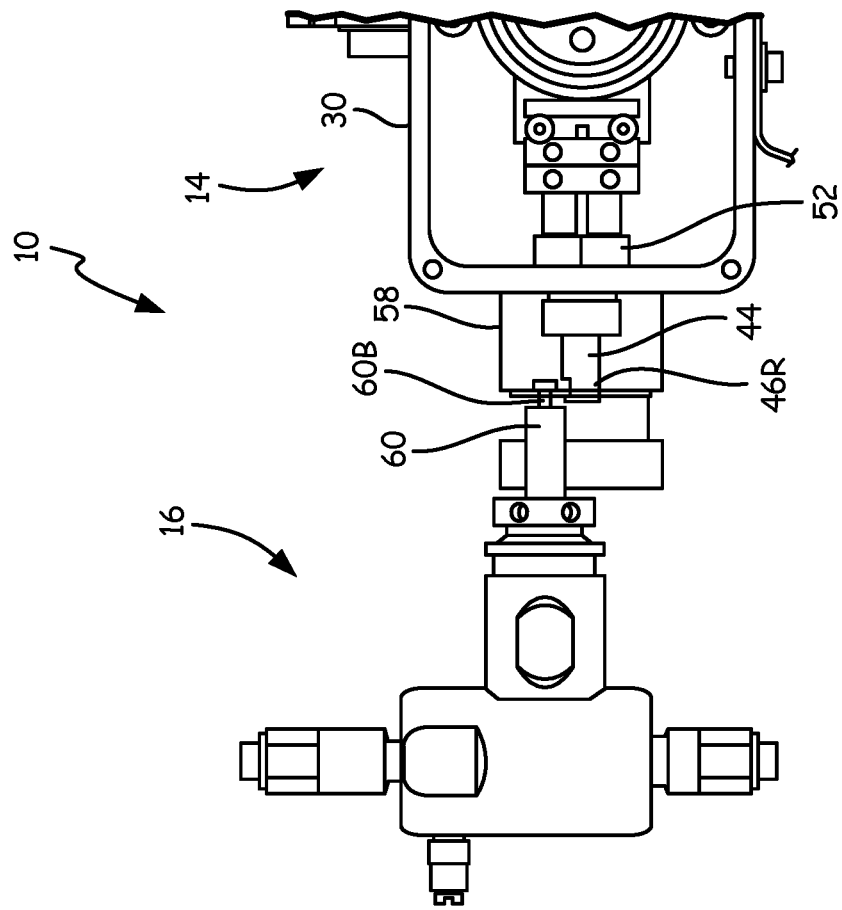
FIG. 4B is an enlarged front view of the metering pump shown in FIG. 4A.
Figure 4A:
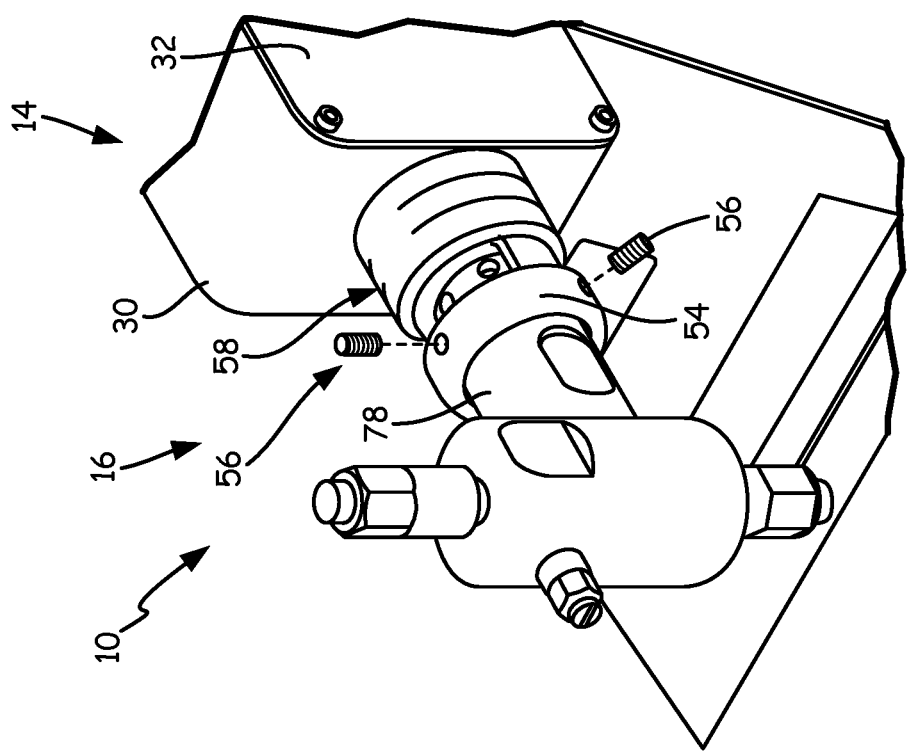
FIG. 4A is an enlarged isometric view of yet another implementation of a metering pump.

FIG. 4A is an enlarged isometric view of yet another implementation of metering pump 10. FIG. 4B is an enlarged front view of metering pump 10 shown in FIG. 4A. Drive housing section 14 includes drive housing 30, drive guard 32, drive shaft 46 (which includes drive shaft receiving end 46R), drive cylinder mating component 52, drive cylinder 54, set screws 56, and dust cover 58. Pump section 16 includes plunger 60 (which includes plunger button end 60B), packing nut 62, and fluid cylinder 78. Drive housing 30 is connected to drive guard 32, and drive cylinder mating component 52. Drive shaft receiving end 46R of drive shaft 46 is connected to plunger button end 60B of plunger 60. Drive cylinder mating component 52 is connected to drive housing 30 and drive cylinder 54. Drive cylinder 54 is connected to fluid cylinder 78. Set screws 56 are connected to drive cylinder 54 and fluid cylinder 78. Dust cover 58 is connected to drive cylinder 54.

Plunger 60 can be serviced or replaced quickly without the use of special tools and, in some instances, without removing drive guard 32. To disconnect plunger 60, packing nut 62 can be exposed by rotating dust cover 58 and sliding it back toward drive housing 30. Packing nut 62 can then be loosened. Set screws 56 can then be loosened from drive cylinder 54, which is fastened to fluid cylinder 78. Once set screws 56 have been removed, fluid cylinder 78 can be released from drive cylinder 54. In some embodiments, drive guard 32 can be removed in order to reposition cam 38 (as shown in FIGS. 2A and 3A), such that the larger side of cam 38 is aligned with the side being repaired. In other embodiments, cam 38 may not need to be adjusted. Plunger 60 can then be disengaged from drive shaft 46 at the coupling of driveshaft receiving end 46R and plunger button end 60B. Decoupling plunger 60 and drive shaft 46 allows for pump section 16 to be removed without needing to access the inside of drive housing 30 or using a special tool to disengage plunger 60 from drive shaft 46. Plunger 60 can thus be quickly repaired, serviced, or replaced to ensure that the downtime of metering pump 10 is minimized.

To reconnect a replacement plunger, the replacement plunger button shaped end can be connected to drive shaft receiving end 46R. The replacement plunger can then be guided into fluid cylinder 78, as fluid cylinder 78 is guided into drive cylinder 54. Set screws 56 can then be used to fasten drive cylinder 54 to fluid cylinder 78. Packing nut 62 can then be tightened. Dust cover 58 can then be pushed forward away from drive housing 30 and then rotated to lock into place. The coupling and structure of drive shaft receiving end 46R and plunger button end 60B thus confer the advantage of providing easy and efficient changeover, minimizing downtime for repair.

While the invention has been described with reference to an exemplary embodiment(s), it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiment(s) disclosed, but that the invention will include all embodiments falling within the scope of the appended claims.

The invention claimed is:

1. A method of servicing a metering pump, wherein the metering pump includes a drive housing, a drive shaft, a drive cylinder, a cover disposed around the drive cylinder, a pump section that includes a packing nut, a fluid cylinder, and a plunger, and set screws that fasten the drive cylinder to the fluid cylinder, the method comprising:

moving the cover with respect to the drive cylinder to expose the packing nut;
loosening the packing nut;
removing the set screws from the drive cylinder;
releasing the fluid cylinder from the drive cylinder;
disengaging the plunger; and
removing the pump section from the metering pump.

2. The method of claim 1, wherein disengaging the plunger includes disengaging a button shaped end of the plunger from a hook shaped receiving end of the drive shaft.

3. The method of claim 2, further comprising replacing the plunger in the pump section with a replacement plunger having a button shaped end.

4. The method of claim 3, further comprising connecting the replacement plunger to the hook shaped receiving end of the drive shaft.

5. The method of claim 4, further comprising guiding the replacement plunger into the fluid cylinder.

6. The method of claim 5, further comprising guiding the fluid cylinder into the drive cylinder.

7. The method of claim 6, further comprising fastening the drive cylinder to the fluid cylinder using the set screws.

8. The method of claim 7, further comprising tightening the packing nut.

9. The method of claim 8, further comprising adjusting the cover with respect to the drive cylinder.

10. The method of claim 9, wherein adjusting the cover with respect to the drive cylinder includes sliding the cover away from the drive housing and toward the fluid cylinder.

11. The method of claim 9, wherein adjusting the cover with respect to the drive cylinder includes rotating the cover to lock the cover in place.

12. The method of claim 1, wherein moving the cover with respect to the drive cylinder includes sliding the cover toward the drive housing.

13. The method of claim 1, wherein moving the cover with respect to the drive cylinder includes rotating the cover.

14. The method of claim 13, wherein rotating the cover includes locking the cover in place.

15. The method of claim 1, further comprising replacing the plunger in the pump section.

16. The method of claim 1, further comprising servicing or repairing the plunger in the pump section.

17. The method of claim 1, wherein disengaging the plunger includes disengaging the plunger from the drive shaft.

18. The method of claim 1, further comprising repositioning a cam within the drive housing of the metering pump.

19. The method of claim 18, further comprising removing a drive guard from the drive housing.

20. The method of claim 1, wherein removing the pump section from the metering pump includes keeping the components inside of the drive housing in place.

* * * * *